United States Patent
Svensson

(10) Patent No.: US 8,246,864 B2
(45) Date of Patent: Aug. 21, 2012

(54) FLAME RETARDANT COMPOSITION

(76) Inventor: Mats Svensson, Malmo (SE)

(*) Notice: Subject to any disclaimer, the term of this patent is extended or adjusted under 35 U.S.C. 154(b) by 96 days.

(21) Appl. No.: 12/672,577

(22) PCT Filed: Apr. 22, 2009

(86) PCT No.: PCT/SE2009/000204
§ 371 (c)(1),
(2), (4) Date: Feb. 8, 2010

(87) PCT Pub. No.: WO2009/131515
PCT Pub. Date: Oct. 29, 2009

(65) Prior Publication Data
US 2011/0204304 A1 Aug. 25, 2011

(30) Foreign Application Priority Data
Apr. 24, 2008 (SE) .................................. 0800926

(51) Int. Cl.
C09K 21/00 (2006.01)
C11D 3/00 (2006.01)
C09D 5/14 (2006.01)
C09D 5/16 (2006.01)
C09D 5/18 (2006.01)

(52) U.S. Cl. ........ 252/601; 252/607; 252/608; 8/115.51; 106/15.05; 106/18.11; 106/18.14; 106/18.23

(58) Field of Classification Search .............. 252/607, 252/601, 608; 8/115.51; 106/15.05, 18.11, 106/18.14, 18.23
See application file for complete search history.

(56) References Cited

U.S. PATENT DOCUMENTS 1,939,082 A * 12/1933 Quinn .......................... 162/159
3,585,135 A * 6/1971 Smith et al. ................. 252/603

FOREIGN PATENT DOCUMENTS

GB 2165270 4/1986
GB 2276639 A * 10/1994

OTHER PUBLICATIONS

Shigeko et al. Flame Retardation of Cellulosic Fibers Characterized by Apparent Activation Energy of Thermal Degradation. Textile Research Journal. 1999. 69, 208-213.*
Day, M. and Wiles, D.M.; "Combustibility of loose fiber fill celllulose insulation. II. The role of a third chemical component in a borax:boric acid system"; Journal of Consumer Product Flammability, (Mar. 1979), vol. 6, pp. 20-17.

* cited by examiner

*Primary Examiner* — Harold Pyon
*Assistant Examiner* — Tanisha Diggs
(74) *Attorney, Agent, or Firm* — Fasth Law Offices; Rolf Fasth

(57) ABSTRACT

The ecological flame retardant composition is adapted to protect materials that are flammable. No bromine or borax components are included in the composition. The composition has at least one of i) a mixture of ammonium sulphate and disodium hydrogen phosphate and ii) a mixture of water, ammonium sulphate and disodium hydrogen phosphate.

10 Claims, 3 Drawing Sheets

FLAME RETARDANT COMPOSITION

PRIOR APPLICATION

This application is a U.S. national phase application based on International Application No. PCT/SE2009/000204, filed 22 Apr. 2009, which claims priority from Sweden application 0800926-8 filed 24 Apr. 2008.

TECHNICAL FIELD

The present invention pertains to an ecological flame retardant composition adapted to protect materials that are flame able, a method therefore, and its utilization.

BACKGROUND ART

The current market for flame retardants is since many years dominated by products containing different bromine compositions. Bromine is one of the most toxic existing halogens very damageable to human beings and to the environment. Inter alia flame retardant products with bromides contain dioxins, which on a long time basis can mutate the genome (DNA) of human beings.

Since flame retardants containing bromide make that much damage a debate is on the agenda in large parts of the world. The European Union has decided that flame retardants containing bromides are to be phased out at the latest in the year 2012 to be replaced by products that are environment friendly. In Sweden alone there exist about 70 brands of flame retardants containing bromide, which all eventually will be forbidden. Moreover, the company Apple® is said to stop utilizing bromides at the latest in the year 2012.

Studies at the hospital "Rigshospitalet" in Copenhagen revealed a correlation of deformations on boys genitals regarding the utilization of flame retardants.

At the Karolinska Institute in Stockholm-Solna, research has revealed a correlation between bromide and brain damages on adults and children.

Therefore there has been a long felt need for an environment friendly alternative to toxic flame retardants.

The patent document GB 2165270 A describes a flame retardant containing bromides.

Another flame retardant ingredient is compositions/compounds of borax such as boric acid, which are expensive and there is a shortage of them. Moreover, there exists a concern that borax is more toxic then what has yet been recognized. Local city authorities do not like the use of borax in flame retardant, because sooner or later it will end up in the sewers where borax can react with other chemicals.

Hence, there is an incentive to replace borax compositions from flame retardants, which are pointed out in the paper to Day, M and Wiles, D. M; "Combustibility of loose fiber fill cellulose insulation II. The role of a third chemical component in a borax: boric acid system"; Journal of Consumer Product Flammability, (Marc 1979), Vol. 6, pages 20-27. This paper discloses salts like sodium phosphate tribasic and ammonium sulphate in a mixture with borax and boric acid as a flame retardant. But the paper only discloses a partly replacement of borax compositions, but not an entire replacement of them. Furthermore, it refers to the paper "E. V. Anderson, Boric Acid Future in Insulation Uncertain. Chem. and Eng. News 56, (15) 11 (1978).".

SUMMARY OF THE INVENTION

The present invention regards a flame retardant composition which does not contain bromide or borax compositions/compounds, but only the salts ammonium sulpha, disodium hydrogen phosphate, thus avoiding problems mentioned above.

Hence, the present invention sets forth an ecological flame retardant composition adapted to protect materials that are flame able. The invention thus comprises:

at least one of a mixture of a predetermined amount of the salts ammonium sulpha and disodium hydrogen phosphate and a mixture of a predetermined amount of water including a predetermined amount of the salts ammonium sulpha, disodium hydrogen phosphate, hereby disregarding bromine compositions and borax compositions in flame retardants.

In one embodiment of the present invention the mixture of the salts ammonium sulpha and disodium hydrogen phosphate constitute a solid composition.

Another embodiment comprises that the mixture of water including the salts ammonium sulpha, disodium hydrogen phosphate and water constitute a fluid composition.

Moreover, the present invention sets forth a method to prepare an ecological flame retardant composition adapted to protect materials that are flame able. Hereby the invention comprises:

mixing at least one of a predetermined amount of the salts ammonium sulpha and disodium hydrogen phosphate, and mixing a predetermined amount of water including a predetermined amount of the salts ammonium sulpha, disodium hydrogen phosphate, hereby disregarding bromine compositions and borax compositions in flame retardants.

One embodiment comprises that the mixture of the salts ammonium sulpha and disodium hydrogen phosphate constitutes a solid composition.

A further embodiment comprises that the mixture of water including the salts ammonium sulpha, disodium hydrogen phosphate constitute a fluid composition.

Furthermore, the present invention sets forth a flame retardant of an ecological composition. The composition is utilized:

as at least one of a predetermined amount of mixture of the salts ammonium sulpha and disodium hydrogen phosphate and a predetermined amount of mixture of water including the salts ammonium sulpha, disodium hydrogen phosphate to protect materials that are flame able, hereby disregarding bromide compositions and borax compositions in flame retardants.

In one embodiment the mixture of the salts ammonium sulpha and disodium hydrogen phosphate constitute a solid composition.

Another embodiment comprises that the mixture of water including the salts ammonium sulpha, disodium hydrogen phosphate and constitute a fluid composition.

A further embodiment comprises that the mixture of the salts ammonium sulpha and disodium hydrogen phosphate is utilized to impregnate plastics.

Yet another embodiment comprises a mixture of water including the salts ammonium sulpha, disodium hydrogen phosphate and that it is utilized to impregnate wood.

Still yet another embodiment comprises that the mixture of water includes the salts ammonium sulpha, disodium hydrogen phosphate and that it is utilized to impregnate fabrics.

Yet a further embodiment comprises that the mixture of water includes the salts ammonium sulpha, disodium hydrogen phosphate and that it is utilized to impregnate metallic materials or alloys of metal.

BRIEF DESCRIPTION OF THE DRAWINGS

Henceforth reference is had to the attached drawings in the accompanying text of the description for a better understanding of the present invention with its embodiments and given examples, wherein.

TABLES

Figure 1:
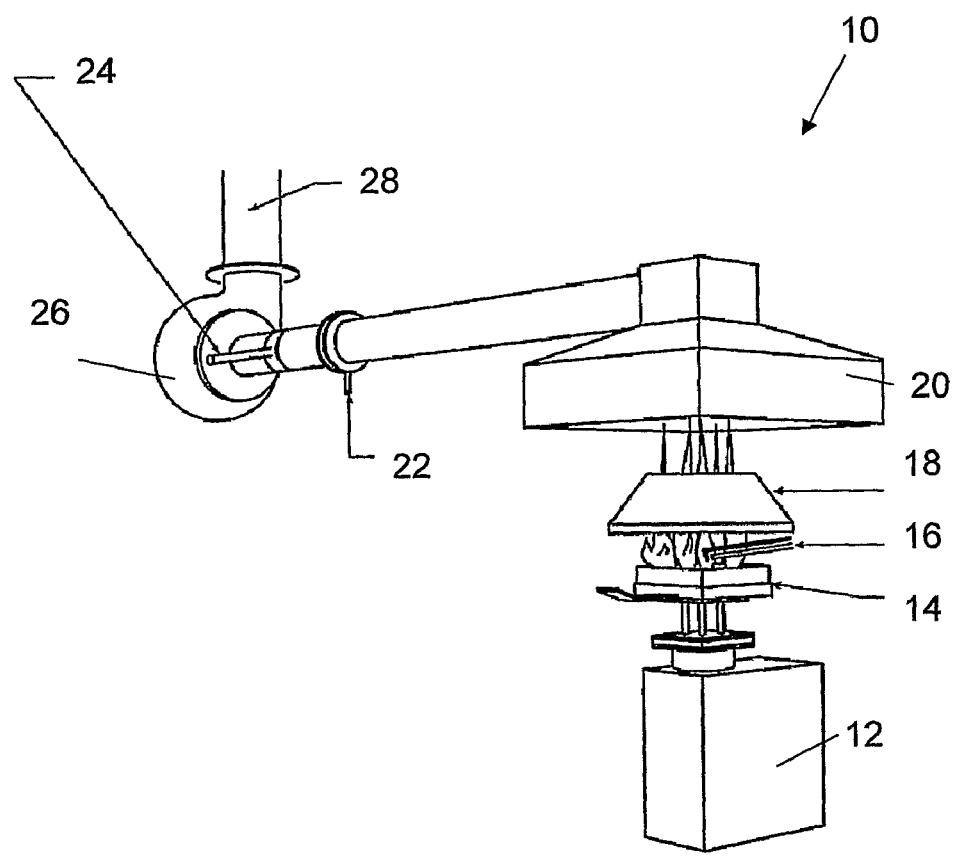
FIG. 1 schematically illustrates a cone calorimeter utilized to test specimens treated with the flame retardant of the present invention by controlled levels of radiant heating.

The following tables are referred to throughout the present description:

Table 1 depicts materials that were tested for heat release and smoke production;

Table 2 depicts measures recorded during tests on the materials in Table 1;

Table 3 depicts further test results on the materials in Table 1;

Table 4 depicts test results on flame retardant treated cotton cloth; and

Table 5 depicts test results on cotton cloth, which was not treated with a flame retardant.

The tables are found at the end of the description.

WORD LIST

In conjunction with the Tables a word list is attached, which explains the abbreviations and variables utilized in the tables.

DETAILED DESCRIPTION OF PREFERRED EMBODIMENTS

The present invention is related to a flame retardant composition which does not contain bromide or borax compositions/compounds, but only the salts ammonium sulpha, disodium hydrogen phosphate. Moreover, the present invention sets forth an ecological flame retardant composition to protect materials that are flame able. As such, in one composition the invention comprises a mixture of a predetermined amount of the salts ammonium sulpha and disodium hydrogen phosphate as a solid/powder composition/compound.

Another composition of the present invention provides a mixture of a predetermined amount of water including a predetermined amount of the salts ammonium sulpha, disodium hydrogen phosphate as a fluid composition.

A preferred embodiment of a water based composition of the salts ammonium sulpha and disodium hydrogen phosphate comprises ammonium sulpha to an amount of 3-7% and disodium hydrogen phosphate to an amount of 3-7% and approximately 80-90% water. The composition has a pH level of 7.6, which indicates that ammonium may have dissolved in the flame retardant fluid, but theoretically only to an amount of maximum 2%. As a fluid, the flame retardant has a boiling point of 100° C., and it is a transparent and colourless fluid.

In another preferred embodiment when the flame retardant of the present invention is in a solid state and/or in a powder/granular form, the amount of ammonium sulpha is between 40 to 60% and the amount of disodium hydrogen phosphate 40 to 60%, to make up 100% when mixed to a composition. It is soluble in water to a maximum of 7.5% at 20° C., and its decomposition temperature is between 240-280° C.

As a disclaimer the both flame retardant compositions mentioned as solid and a fluid do not contain compositions of bromine and borax products.

The objective of a flame retardant is to prevent and/or delay the upcoming of a fire. A flame retardant should be able to prevent the upcoming of fire in 12 to 15 min. Utilized conventional flame retardants are the so called bromide flame retardants. Bromide flame retardants are currently one of the most damageable to the environment, and in longer terms can cause mutations of a person's DNA.

Every day approximately 550000 persons perish in fires all over the world. This is the fourth most common cause to accidents. Hence, the demand on taking fire preventive measures increase and the industry is under pressure to change to environmental fire protections.

The present invention flame retardant is very environment friendly. It is even possible to drink, as it is based on two salts, ammonium sulpha and disodium hydrogen phosphate that are classified as food.

A large number of tests on the present invention salts as flame retardants have been administrated at the accredited laboratory, SP Technical Research Institute of Sweden (Statens Provningsansatalt) in Borås Sweden. All the tests included testing booth fabrics and surface materials such as building materials with excellent results, which are further elaborated in the following description. One result of the test was that the flame retardant of the present invention fulfilled the Swedish regulations for building materials, which apply as guidelines for constructors when choosing building materials. The present invention flame retardant is non toxic, and thereby friendly to the environment.

When a material impregnated with the present invention flame retardant is heated a powerful reaction with the salts contained arises. A carbon layer is created, which suppresses the oxygen, and as is well known without oxygen no fire. Test on different materials such as paper tissues to fabrics showed that it is almost impossible to create fire on the materials treated with the present invention flame retardant.

SP has conducted multiple tests, which all ended with excellent results. The fabrics that were tested and had the flame retardant applied underwent six fire tests, i.a., according to tests under the regulations of SIS 65 00 82, and no fire arose which made SP classify the materials as hard to set on fire.

Other materials that underwent tests were wood, soft board, particle board, and plywood so called surface materials. Normally those materials should be pressure impregnated with the flame retardant of the present invention for maximum resistance against fire. But those materials were only soaked during the tests at SP, and although passed the tests according to the Swedish building regulations.

Currently numerous test with the flame retardant are conducted on plastics. These tests are supposed to end in 2010, and will form a basis for the utilization of the flame retardant at global manufactures of plastics. In year 2007 104 persons perished during fires in Sweden, and approximately 1.5 schools a day are exposed to fire. Due to the current increased utilization of plastics, the time for a fire to start has decreased from 15 min. to 3 min. in the past fifty years.

In its powder/granular form the flame retardant of the present invention will be mixed with plastic materials during the manufacture of plastic items, thus being embedded in the plastic product manufactured to act as a flame retardant.

FIG. 1 schematically illustrates a cone calorimeter 10 utilized to test specimens treated with the flame retardant of the present invention by controlled levels of radiant heating at SP. Specimens or samples utilized during testing are depicted in the attached Table 1. With the cone calorimeter 10, ISO 5660-1, the specimens of 0.1 by 0.1 m are exposed to controlled levels of radiant heating. The specimen surface is therefore heated up and an external spark ignitor 16 ignites pyrolysis gases from the specimen. Gases are collected by a hood 20 an extracted by an exhaust fan 26.

The cone calorimeter itself is made up of a load cell 12, and a sample 14 is positioned on it. From the spark ignitor 16 a cone heater 18 leads gases to the exhaust hood 20, and reference numeral 22 indicates were gas samples are taken. The calorimeter has a laser extinction beam 24 including temperature measurements, and at 28 temperature and differential pressure measurements are taken.

Heat release rate (HRR) is determined by measurements of the oxygen consumption derived from the oxygen concentration and the flow rate in the exhaust duct. As mentioned the specimen 14 is placed on the load cell 12 during testing. A retainer flame covers the periphery of the specimen 14, and smoke rate is measured by the laser system 24.

Now with reference to Table 2 only one test on each material, soft board (sample A), Article board, light (sample B), plywood (sample C), and particle board, dark (D), were carried out, instead of the three stipulated in the standard. It can thus not be used as the sole basis for a classification or an approval. A ConeTools (software) simulation is not part of the accreditation referred to.

All products were tested with an irradiance of 35 kW/m$^2$. The simulation software ConeTools indicates the classification according to EN 13501-1 based on ISO 5660 test results. In Table 2 a summary of the test results are given including the FIGRA value and classification. It should be noted that the final classification according to EN 13501-1 is based also on smoke production and burning droplets/debris, which is not taken to account by ConeTools.

According to Swedish building regulations walls and ceiling surface materials in buildings of class Br2 and Br3 shall have properties C-s2, d0 or D-s2, d0. In escape ways in buildings of class Br1 properties B-s1, d0 and C-s2, d0 are asked for.

The test results in Table 3 were achieved in accordance with ISO 5660-1:2002 and ISO 5660-2:2002. The tested product was a water based flame retardant according to the present invention. All materials in Table 2 were soaked for 48 hours in the flame retardant, and the tests were performed with the test specifications irradiance level: 35 kW/m$^2$, calibration constant (C): 0.042221 m$^{1/2}$ g$^{12}$ K$^{1/2}$, orientation: horizontal, backing: no other than the non-combustible required in the standard, fastening: the product was loosely put on the backing, and note: a retainer frame was used. It should be noted that the symbol * indicates no ignition and the symbol ** no heat release data is given since the tested specimen did not ignite. Smoke production for sample specimen A and D is slightly underestimated due to a measurement error. See FIGS. 4 and 5.

Figure 2:
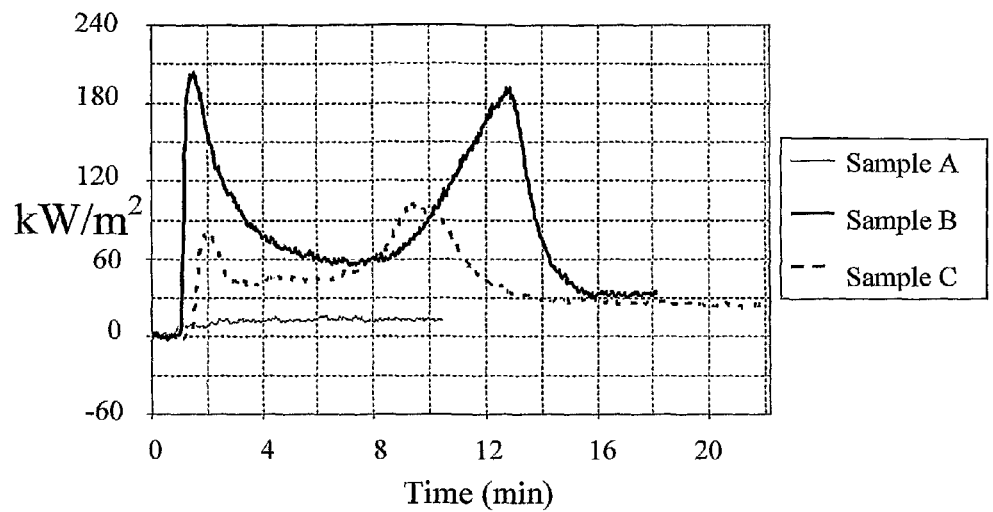
FIG. 2 depicts a graph of heat release rate for samples A to C applying the flame retardant according to the present invention on the samples.

FIG. 2 depicts a graph of heat release rate for samples A to C applying the flame retardant according to the present invention on the samples specimen in a single test at irradiance 35 kW/m$^2$.

Figure 3:
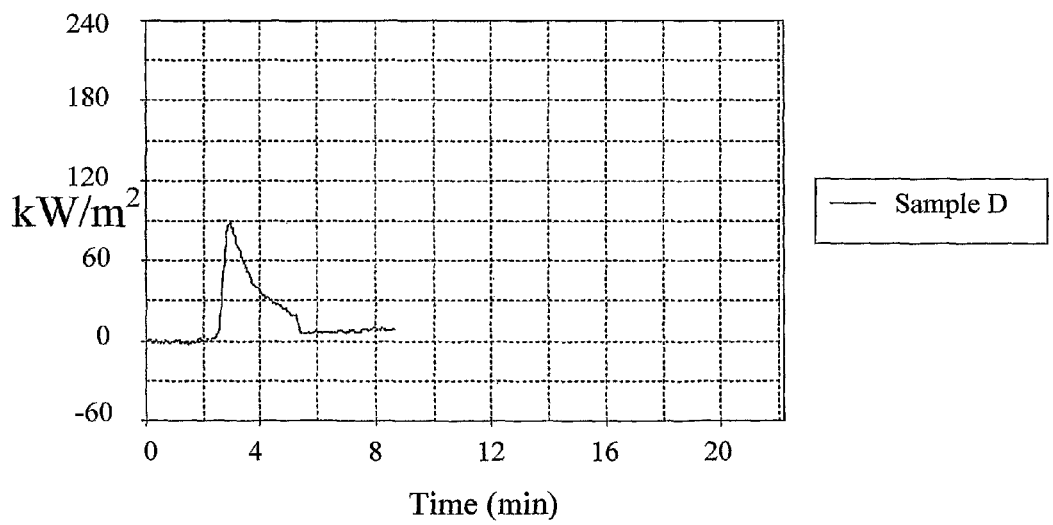
FIG. 3 depicts a graph of heat release rate for sample D applying the flame retardant according to the present invention on the sample.

FIG. 3 depicts a graph of heat release rate for sample D applying the flame retardant according to the present invention on the sample specimen in a single test at irradiance 35 kW/m$^2$.

Figure 4:
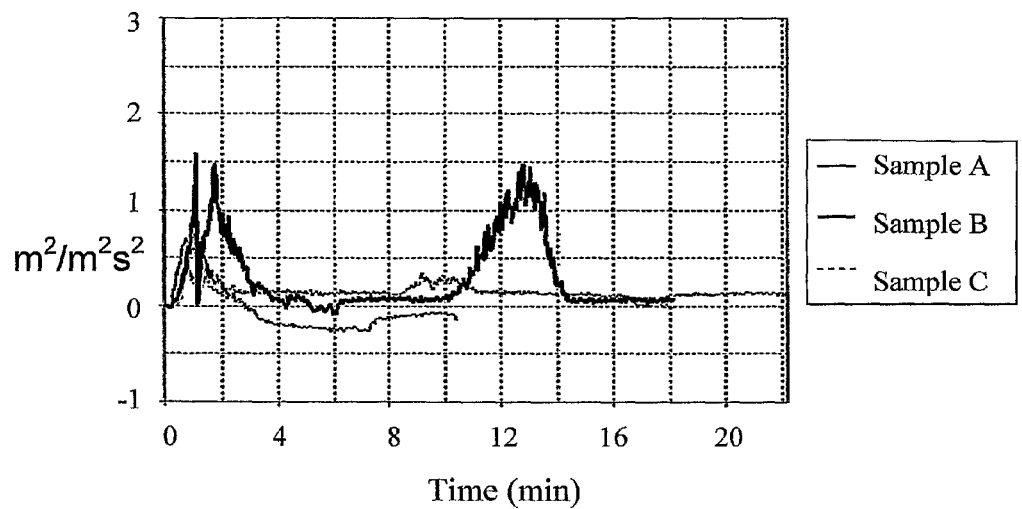
FIG. 4 depicts a graph of smoke production rate for samples A to C applying the flame retardant according to the present invention on the samples.

FIG. 4 depicts a graph of smoke production rate for samples A to C applying the flame retardant according to the present invention on the samples specimen in a single test at irradiance 35 kW/m$^2$.

Figure 5:
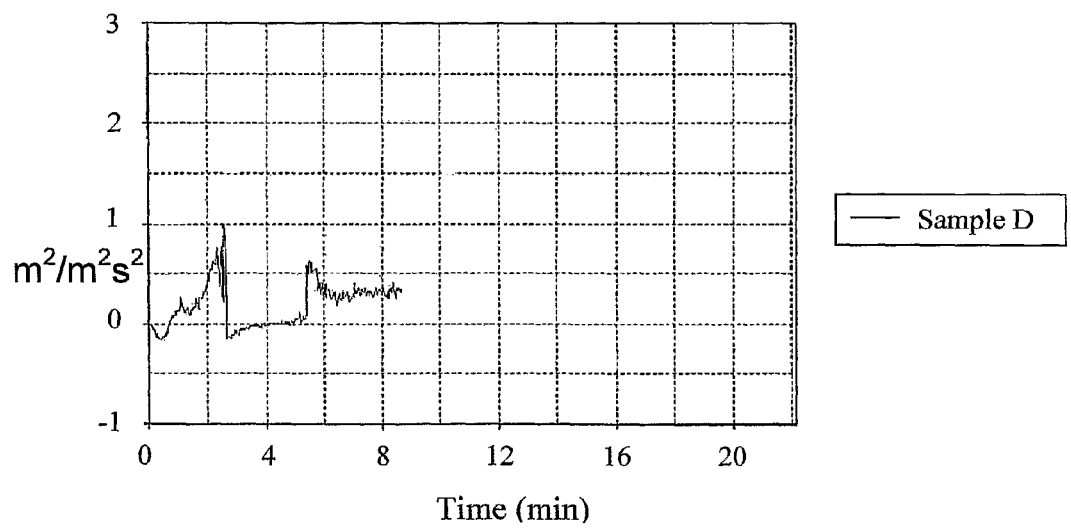
FIG. 5 depicts a graph of smoke production rate for sample D applying the flame retardant according to the present invention on the sample.

FIG. 5 depicts a graph of smoke production rate for sample D applying the flame retardant according to the present invention on the sample specimen in a single test at irradiance 35 kW/m$^2$.

In Table 4 is depicted how the flame retardant of the present invention reacts when cotton cloth was applied with the flame retardant through spraying. Non treated cotton cloth has a nominal area weight of 155 g/m$^2$ and the cotton cloth treated with the flame retardant has a nominal area weight of 175 g/m$^2$ (dry weight). According to Swedish rules, issued by The national Board of Housing, Building and Planning (Boverket), common advices 1993:2, the test with the worst result should be ignored when calculating an average value, thus test no. 3 was excluded when the average values were calculated. The test was performed with a specimen of approximately 0.4 mm and an area weight of approximately 175 g/m$^2$ at the conditions temperature (20+5/−2)° C., and a relative humidity of (65±2) %. It was not pre-treated with laundry or dry-cleaning prior to the test.

Finally, cotton cloth that was not treated with the flame retardant of the present invention was tested, under the same conditions, and the result is depicted in Table 5. As it was not sprayed with flame retardant the weight of the cloth was 155 g/m2.

As can be seen when comparing the results of Table 4 and Table 5, the present invention flame retardant provides a very good flame protection without the use of bromine or borax compositions.

The present invention is not restricted to the examples and given embodiments presented above. A person skilled in the art is able to derive further possible embodiments by the attached set of claims.

While the present invention has been described in accordance with preferred compositions and embodiments, it is to be understood that certain substitutions and alterations may be made thereto without departing from the spirit and scope of the following claims.

WORD LIST

| Test results explanation - ISO 5660 | |
|---|---|
| Parameter | Explanation |
| Test start | The test specimen is subjected to the irradiance and the clock is started. |
| $t_{flash}$ | Time from test start until flames with shorter duration than 1 s. |
| $t_{ign}$ | Time from test start until sustained flaming with duration more than 10 s. |
| $T_{ext}$ | Time from test start until the flames have died out. |
| End of test | Defined as the time when both, the product has been extinguished for 2 minutes, and the mass loss is less than 150 g/m$^2$ during 1 minute. |

| Parameter | Explanation |
|---|---|
| $T_{test}$ | Test time. From test start until end of test. |
| $q_{max}$ | Peak heat release rate during the entire test. |
| $q_{180}$ | Average heat release rate during 3 minutes from ignition. If the test is terminated before, the heat release rate is taken as 0 from the end of test. |
| $q_{300}$ | Average heat release rate during 5 minutes from ignition. If the test is terminated before, the heat release rate is taken as 0 from the end of test. |
| THR | Total Heat Released from test start until end of test. |
| $SPR_{max}$ | Peak Smoke Production Rate from test start until end of test. |
| TSP | Total Smoke Produced from test start until end of test. |
| M0 | Mass of specimen. |
| Ms | Mass of specimen at sustained flaming. |
| Mf | Mass of specimen at the end of the test. |
| $MLR_{ign-end}$ | Mass Loss Rate. Average mass loss rate from ignition until end of test. |
| $MLR_{10-90}$ | Mass Loss Rate. Average mass loss rate between 10% and 90% of mass loss. |
| TML | Total mass loss from ignition until end of test. |
| $\Delta H_c$ | Effective heat of combustion calculated as the ratio between total energy released and total mass loss calculated from ignition until end of test. |
| SEA | Specific Extinction Area defined as the ratio between total smoke released and total mass loss calculated from test start until end of test. |
| MARHE | Maximum Average Rate of Heat Emission defined as the maximum of the function (cumulative heat release between t = 0 and time = t) divided by (time = t). |
| V | Volume flow rate in exhaust duct. Average during the test. |

TABLE 1

| Sample | Marked |
|---|---|
| A | Soft board |
| B | Particle board, light |
| C | Plywood |
| D | Particle board, dark |

TABLE 2

| Product | $t_{ign}$ (s) | $q_{max}$ (kW/m2) | $FIGRA_{0.4\,MJ}$ (W/s) | TSP (m²) | Indicated class |
|---|---|---|---|---|---|
| A | NI* | — | — | — | B |
| B | 66 | 203 | 316 | 3 | D |
| C | 87 | 103 | 64 | 2 | C |
| D | 157 | 89 | 27 | 0 | B |

*NI = No ignition

TABLE 3

Test results

| Property | Name of variable | Sample A | Sample B | Sample C | Sample D |
|---|---|---|---|---|---|
| Flashing (min:s) | $t_{flash}$ | — | — | — | — |
| Ignition (min:s) | $t_{ign}$ | NI* | 01:06 | 01:27 | 02:37 |
| All flaming ceased (min:s) | $t_{ext}$ | — | 15:49 | 19:54 | 05:23 |
| Test time (min:s) | $t_{test}$ | 10:00 | 17:49 | 21:54 | 07:23 |
| Heat release rate (kW/m²) | q | See FIG. 2 | | | See FIG. 3 |
| Peak heat release rate (kW/m²) | $q_{max}$ | —** | 203 | 103 | 89 |
| Average heat release, 3 min (kW/m²) | $q_{180}$ | —** | 126 | 51 | 40 |
| Average heat release, 5 min (kW/m²) | $q_{300}$ | —** | 102 | 49 | 27 |
| Total heat produced (MJ/m²) | THR | —** | 88.7 | 54.4 | 8.1 |
| Smoke production rate (m²/m²s) | SPR | See FIG. 4 | | | See FIG. 5 |
| Peak smoke production (m²/m²s) | $SPR_{max}$ | 0.8 | 1.6 | 0.4 | 1.0 |
| Total smoke production over the non-flaming phase (m²/m²) | $TSP_{nonfl}$ | — | 21.1 | 12.7 | 34.7 |
| Total smoke production over the flaming phase (m²/m²) | $TSP_{fl}$ | — | 289 | 170 | 44 |
| Total smoke production (m²/m²) | TSP | — | 310 | 183 | 79 |
| Sample mass before test (g) | $M_0$ | 60.0 | 86.7 | 61.9 | 104.4 |
| Sample mass at sustained flaming (g) | $M_s$ | — | 85.7 | 59.3 | 99.5 |
| Sample mass after test (g) | $M_f$ | 37.2 | 18.6 | 13.0 | 83.1 |
| Average mass loss rate (g/m²s) | $MLR_{ign-end}$ | — | 7.5 | 4.3 | 6.4 |
| Average mass loss rate (g/m²s) | $MLR_{10-90}$ | 4.4 | 8.9 | 5.7 | 6.4 |
| Total mass loss (g/m²) | TML | — | 7588 | 5233 | 1855 |
| Effective heat of combustion (MJ/kg) | $\Delta H_c$ | —** | 11.7 | 10.4 | 4.4 |
| Specific smoke production (m²/kg) | SEA | — | 41 | 35 | 43 |

TABLE 3-continued

| Property | Name of variable | Sample A | Sample B | Sample C | Sample D |
|---|---|---|---|---|---|
| Max average rate of heat emission (kW/m$^2$) | MARHE | 11.5 | 96.0 | 52.8 | 23.1 |
| Volume flow in exhaust duct (l/s) | V | 24 | 24 | 24 | 24 |

*NI = no ignition
**No heat release data is given since the specimen did not ignite.
Note
Smoke production for product A and D is slightly under-estimated due to a measurement error

TABLE 4

Test results

| | Test no | | | | | | |
|---|---|---|---|---|---|---|---|
| Direction | 1 ↑ | 2 ↑ | (3) (↑) | 4 → | 5 → | 6 → | Average value of 5 tests |
| After flame time, s | 0 | 0 | (0) | 0 | 0 | 0 | 0 |
| After glow time, s | 0 | 0 | (0) | 0 | 0 | 0 | 0 |
| Damaged length, mm | 68 | 70 | (79) | 67 | 72 | 69 | 69 |
| Burning drops | No | No | (No) | No | No | No | — |

TABLE 5

Test results

| | Test no | | | | | | |
|---|---|---|---|---|---|---|---|
| Direction | 1 ↑ | 2 ↑ | 3 ↑ | 4 → | 5 → | 6 → | Average value of 5 tests |
| After flame time, s | 17 | — | — | 18 | — | — | — |
| After glow time, s | 0 | — | — | 0 | — | — | — |
| Damaged length, mm | 300 | — | — | 300 | — | — | — |
| Burning drops | No | — | — | No | — | — | — |

The invention claimed is:

1. An ecological flame retardant composition adapted to protect materials that are flammable, consisting of at least one of:
   i) a mixture of ammonium sulphate and disodium hydrogen phosphate and
   ii) a mixture of water, ammonium sulphate and disodium hydrogen phosphate.

2. The ecological flame retardant composition according to claim 1, wherein the mixture of ammonium sulphate and disodium hydrogen phosphate constitutes a solid composition.

3. The ecological flame retardant composition according to claim 1, wherein the mixture of water, ammonium sulphate and disodium hydrogen phosphate constitutes a fluid composition.

4. A method to prepare an ecological flame retardant composition adapted to protect materials that are flammable, consisting of mixing at least one of:
   i) ammonium sulphate and disodium hydrogen phosphate and
   ii) water, ammonium sulphate and disodium hydrogen phosphate.

5. The method according to claim 4, wherein the mixture of ammonium sulphate and disodium hydrogen phosphate constitutes a solid composition.

6. The method according to claim 4, wherein the mixture of water, ammonium sulphate and disodium hydrogen phosphate constitutes a fluid composition.

7. The ecological flame retardant composition according to claim 1, wherein the mixture of ammonium sulphate and disodium hydrogen phosphate is utilized to impregnate pigsties.

8. The ecological flame retardant composition according to claim 1, wherein said mixture of water, ammonium sulphate and disodium hydrogen phosphate is utilized to impregnate wood.

9. The ecological flame retardant composition according to claim 1, wherein the mixture of water, ammonium sulphate and disodium hydrogen phosphate is utilized to impregnate fabrics.

10. The ecological flame retardant composition according to claim 1, wherein the mixture of water, ammonium sulphate and disodium hydrogen phosphate is utilized to impregnate metallic materials or alloys of metal.

* * * * *